(12) United States Patent
Zhang et al.

(10) Patent No.: US 8,965,151 B1
(45) Date of Patent: Feb. 24, 2015

(54) LOW INSERTION LOSS, LOW BACK REFLECTION FIBER OPTIC ROTARY JOINT WITH INCREASED DATA THROUGHPUT

(71) Applicant: Princetel Inc., Hamilton, NJ (US)

(72) Inventors: Hong Zhang, North Brunswick, NJ (US); Boying B Zhang, Lawrenceville, NJ (US); Louis D Violante, Monroe, NJ (US)

(73) Assignee: Princetel Inc., Hamilton, NJ (US)

( * ) Notice: Subject to any disclaimer, the term of this patent is extended or adjusted under 35 U.S.C. 154(b) by 58 days.

(21) Appl. No.: 14/024,984

(22) Filed: Sep. 12, 2013

(51) Int. Cl.
*G02B 6/00* (2006.01)
*G02B 6/26* (2006.01)
*G02B 6/36* (2006.01)

(52) U.S. Cl.
CPC .................... *G02B 6/3604* (2013.01)
USPC ............................ 385/26; 385/147

(58) Field of Classification Search
USPC ........................... 385/24, 26, 28, 29
See application file for complete search history.

(56) References Cited

U.S. PATENT DOCUMENTS

| | | | |
|---|---|---|---|
| 5,157,745 A | 10/1992 | Ames | |
| 6,208,318 B1 * | 3/2001 | Anderson et al. | 345/1.1 |
| 6,898,346 B2 * | 5/2005 | Mercey et al. | 385/26 |
| 7,724,996 B2 * | 5/2010 | Popp et al. | 385/33 |
| 7,729,571 B2 * | 6/2010 | Popp | 385/26 |
| 7,734,130 B2 * | 6/2010 | Popp | 385/25 |
| 7,876,985 B2 * | 1/2011 | Popp et al. | 385/25 |
| 7,965,943 B2 * | 6/2011 | Popp et al. | 398/142 |
| 8,355,607 B2 * | 1/2013 | Zhang et al. | 385/26 |

* cited by examiner

*Primary Examiner* — Akm Enayet Ullah

(57) ABSTRACT

A low insertion loss, low back reflection fiber optic rotary joint with increased data throughput capabilities has been invented. This is accomplished by using a dispersion free prism with optical coatings to minimize the amount of back reflection caused by the optical beam passing through the prism-air interface.

3 Claims, 5 Drawing Sheets

LOW INSERTION LOSS, LOW BACK REFLECTION FIBER OPTIC ROTARY JOINT WITH INCREASED DATA THROUGHPUT

BACKGROUND OF THE INVENTION

A typical rotary joint consists of a fixed collimator holder and a rotatable collimator holder which are relatively rotatable to each other to allow uninterrupted transmission of optical signals through the rotational interface from collimators in any one of the holders to the collimators in the other holder.

A multi-channel fiber optic rotary joint typically utilizes a dove prism and a gear box as the de-rotating mechanism between the fixed collimator holder and the rotatable collimator holder. It typically rotates at half the rotational speed of the rotatable collimator holder; effectively de-rotation the image.

The dove prism relies on refraction to bend the optical beam as part of the de-rotation; which theoretically should not cause a problem. However, in practice this refraction is a source of chromatic dispersion because optical signals have a finite spectral range. Since the angle of refraction is a partial function of the wavelength itself, each discrete wavelength in the optical signal travels a different distance in the dove prism which causes part of the signal to effectively fall behind other parts of the signal. This signal lag ultimately determines the maximum frequency at which a signal can be sent through the fiber optic rotary joint. One way to envision this problem is to picture a square wave. Each peak of the wave represents a discrete piece of information and the width of each peak represents the amount of dispersion in the signal. Now the only way to send the same information faster is to reduce the distance between signal peaks; however, if the distance between peaks is reduced to the point that the waves start to overlap then the information in the two waves starts to become scrambled. Therefore, the frequency at which a signal can be sent is limited by the width of each wave, or the amount of dispersion that occurs in the signal.

Another effect of dispersion is it effectively limits the wavelengths at which a particular device can be used. One of the results of different wavelengths traveling slightly different distances through the prism is each wavelength will emerge at different angles on the other side of the prism. As such, a device tuned at 1625 nm will not perform the same if used at 1310 nm. The degree to which the performance will degrade is directly related to the difference between the wavelengths in question. As such the unit will have better performance the closer the operating wavelength is to the wavelength at which the unit was tuned. Conversely, the performance of the unit will degrade the farther the operating wavelength is from the wavelength at which the unit was tuned.

This phenomena also sets a floor for the lowest achievable insertion loss. The cause of this lower limit is that in practice every light source has a finite spectral range around the nominal wavelength. The slight variation in the distance traveled by each wavelengths in the spectral range cause slight variations in the focal point for each wavelength in the spectral range. This theoretically reduces the efficiency with which the opposing collimator could recapture the signal, thereby putting a theoretical limit on the lowest achievable insertion loss.

All of the aforementioned problems can be resolved by using a de-rotating prism that does not rely on refraction, such as the Pechan prism or the K-prism. However, as Ames correctly indicated in U.S. Pat. No. 5,157,745; the Pechan prism suffers from high back reflection. This problem leads Ames to conclude that the dove prism is preferable. The configuration embodied herein, solves the back reflection problem by applying an optical coating to the surfaces of the Pechan prism through which the optical signal must pass. This optical coating will eliminate/reduce the reflection at zero degree and function as a mirror at 45 degrees as well. Similarly, high reflection optical coatings can be applied to the surfaces of the K-prism through which the optical signal must pass for the same net result.

DETAIL DESCRIPTION OF INVENTION

Figure 1:
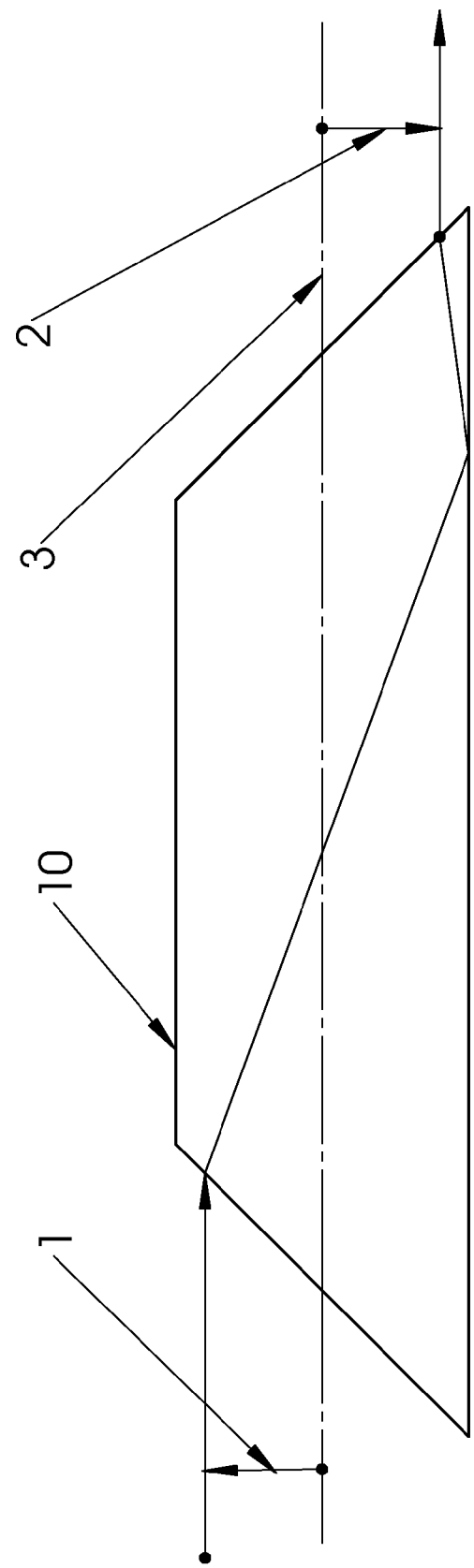
FIG. 1—Is the schematic drawing of de-rotating Dove prism.

Dove prisms are used to invert an image and when they are rotated about their longitudinal axis, the transmitted image rotates at twice the rate of the prism (see FIG. 1). Therefore, if the prism rotates at half the rate of a rotating object, the image, after passing through the prism, will appear to be stationary. FIG. 1 is the schematic drawing of de-rotating Dove prism in the prior art. The image (2) of an object (1) is inverted by the Dove prism (10). Furthermore, if the prism (10) is rotated about the optic axis (3), the image (2) rotates at twice the rate of rotation of Dove prism (10).

Figure 2:
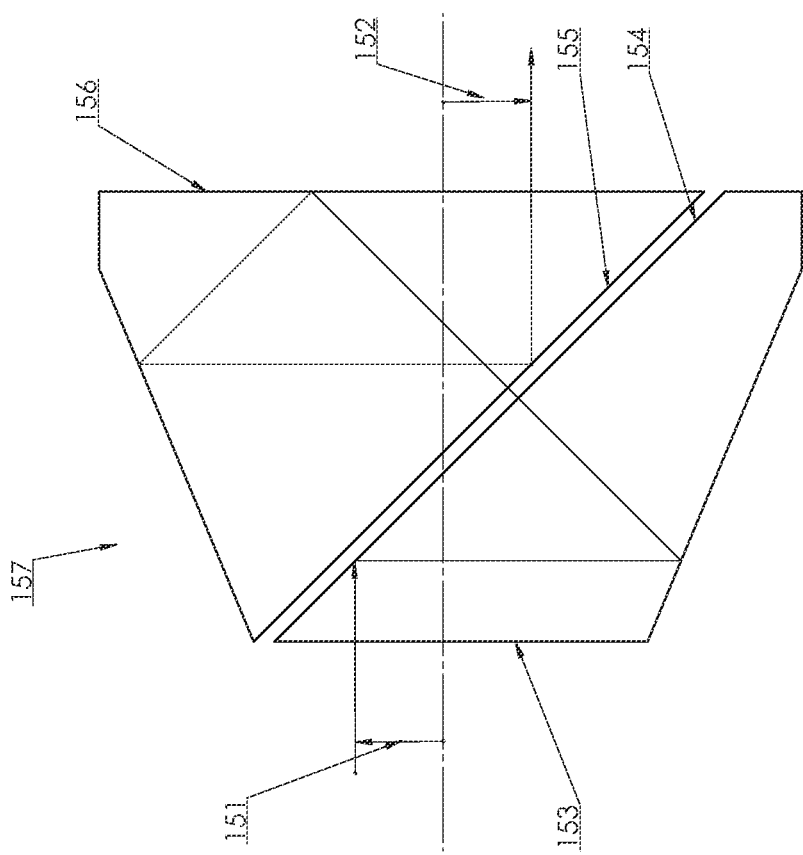
FIG. 2—Is an outline diagram a coated Pechan prism in the present invention.

FIG. 2 illustrates the imaging principle of the coated Pechan prism in the present invention. The image (152) of an object (151) on the entrance side of a coated Pechan prism (157) is inverted in a similar way as the Dove prism (10) in FIG. 1. However, there is one critical difference; there are no refractive elements in the optical path of the coated Pechan Prism. As a result, there will not be any dispersion of the optical beam. It is also important to note that the prism surfaces through which the beam passes (153, 154, 155 and 156) must be coated with an optical coating to reduce the back reflection to an acceptable number.

Figure 3:
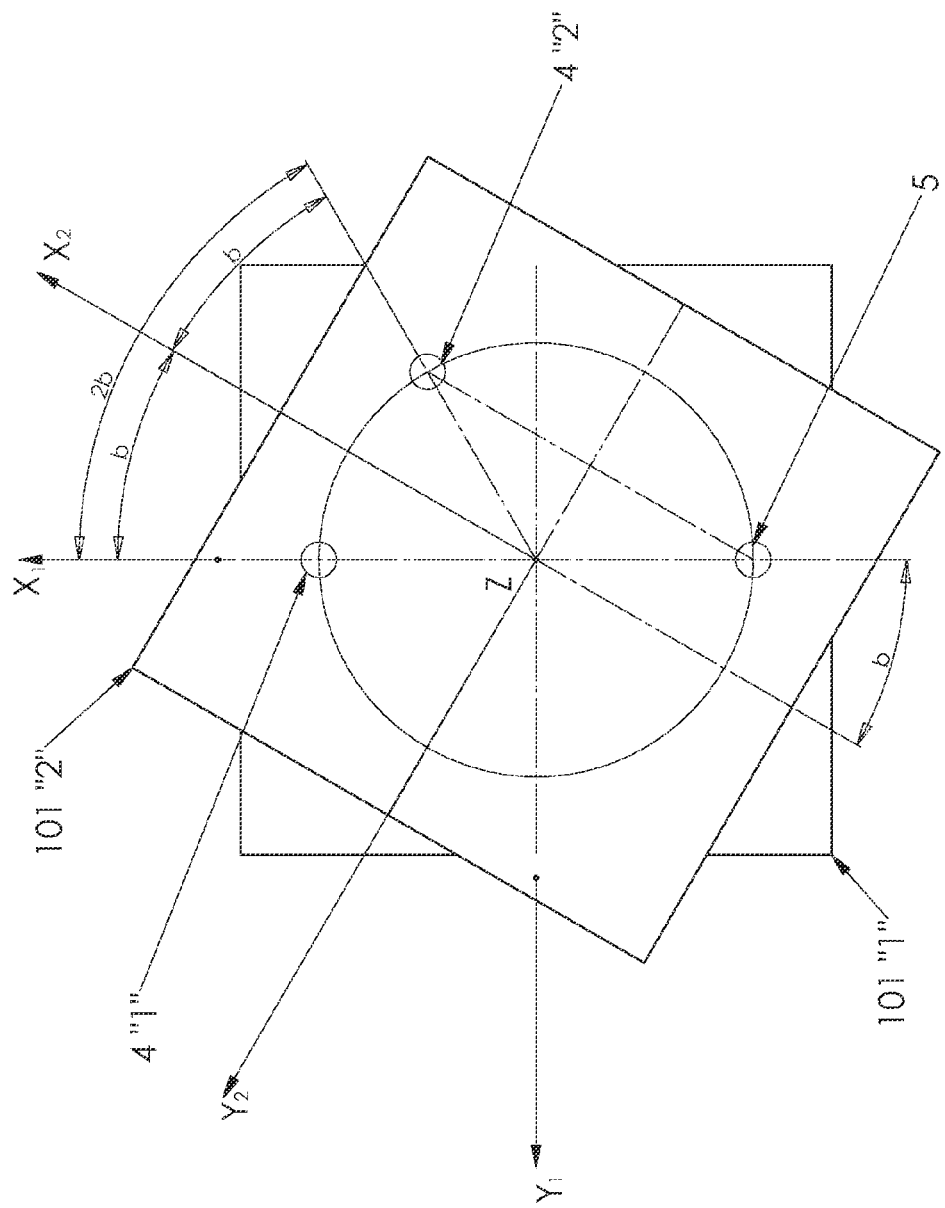
FIG. 3—Illustrates the principles of a coated Pechan prism for a multi-channel fiber optic rotary joint in the present invention.

FIG. 3 depicts how the coated Pechan prism (101) can be used as a de-rotating mechanism for the multi-channel fiber optic rotary joint in the present invention. Suppose the coated Pechan prism (101) rotates an angle "b" around its axis "Z" from position "1" to position "2", e.g., from 101"1" to 101"2". The co-ordinates of the object (4) in position "1", e.g., 4 "1", is (X1, Y1). According to FIG. 2, because the image (5) is inverted symmetrically relative to the axis "Z", the co-ordinates of the image (5) in position "1" are (−X1, Y1). If the object rotates an angle "2b" around axis "Z" in the same direction as the coated Pechan prism (101), the co-ordinates of the object (4) in position "2", e.g., 4 "2", are (X2, Y2). It's easy to get that the co-ordinates of the image (5) in position "2" are (−X2, Y2). So the absolute position of the image (5) remains the same before and after the rotation. That means that if the coated Pechan prism rotates at half the speed of a rotating object (4), its image (5) passing through the coated Pechan prism (101), will remain to be stationary.

Figure 4:
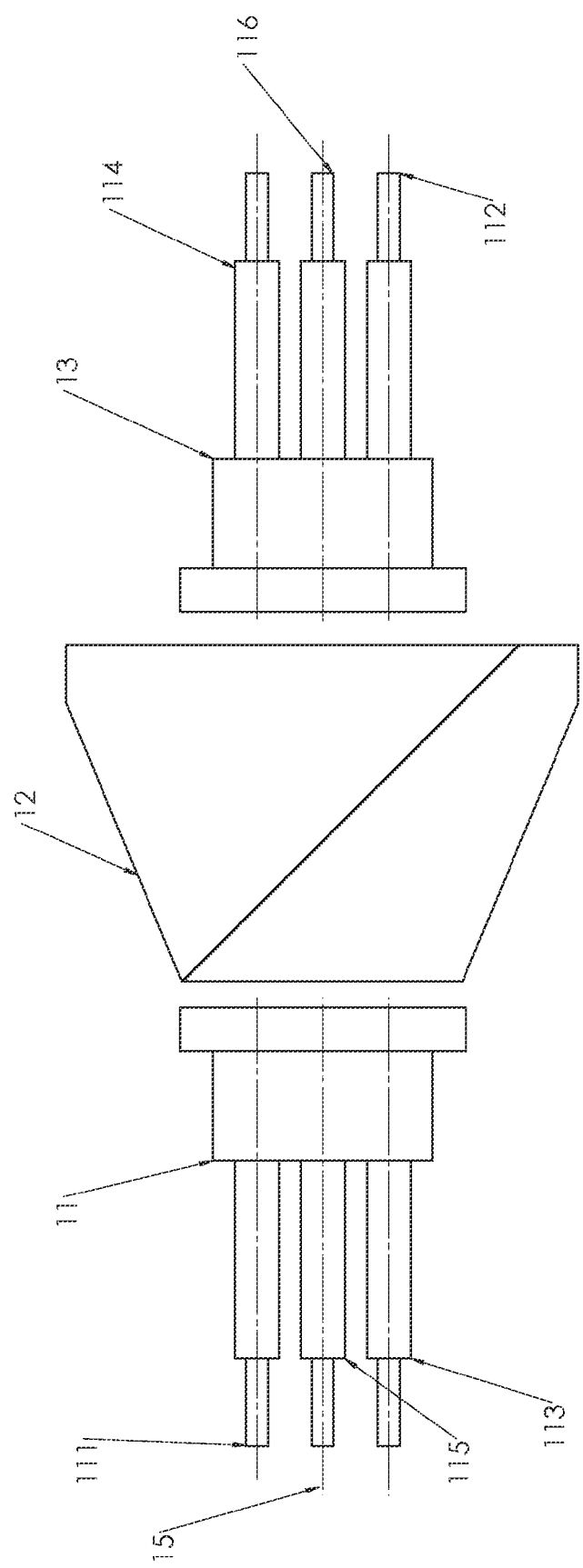
FIG. 4—Depicts the position of coated Pechan prism relative to a stationary collimator array and a fiber collimator array in the present invention.

In FIG. 4, a coated Pechan prism de-rotating mechanism (12) in the present invention is positioned between a stationary collimator array (13) and a rotary collimator array (11). The rotary collimator array (11), the stationary collimator array (13) and the coated Pechan prism de-rotating mechanism (12) are rotatable around a common axis (15). All the collimators (111, 112, 113, 114, 115, 116 . . . ) in said stationary collimator array (13) and said rotary collimator array (11) are arranged parallel to the common axis (15). If the coated Pechan prism de-rotating mechanism (12) rotates at half the speed of rotation of said rotary collimator array (11) around the common axis (15), the optical signals from the rotary collimator array (11) would be passed through the coated Pechan prism de-rotating mechanism (12) and be transmitted to the related channel of the stationary collimator array (13) respectively, e.g., the first channel optical signal can be transmitted between collimator (111) and (112); the second channel optical signal can be transmitted between collimator (115) and (116); the third channel optical signal can be transmitted between collimator (113) and (114), so as to provide a continuous, bi-directional, multi-channel electro-magnetic signal transmission between two collimator arrays.

Figure 5:
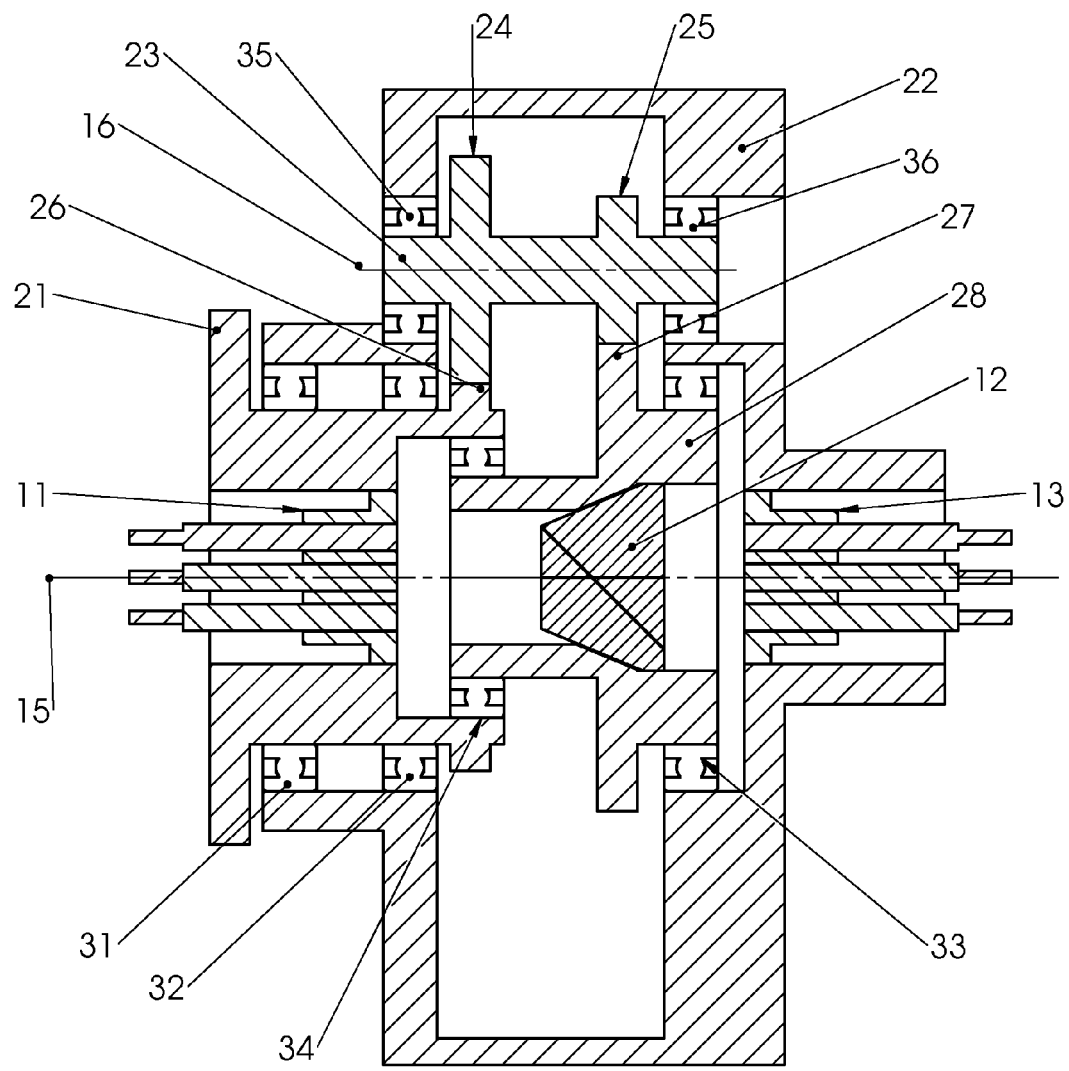
FIG. 5—Is a cross-sectional view of a multi-channel fiber optic rotary joint in the present invention.

FIG. 5 depicts one of embodiments of a multi-channel fiber optic rotary joint of the present invention. A speed reduction mechanism includes gears (24, 25, 26, and 27) in which two gears (26 and 27) are rotatable around the common axis (15), while the other two gears (24 and 25) are rotatable around a parallel axis (16). The gear ratio i from gears 26 to gear 27 can be determined as follows:

$$i = \frac{Z_{24} Z_{27}}{Z_{26} Z_{25}}$$

where, $Z_{24}$, $Z_{25}$, $Z_{26}$ and $Z_{27}$ are the number of gear teeth number for gears 24, 25, 26 and 27 respectively. If the gear ratio i=2:1, that means gear 27 will rotate at half the speed of the rotation of gear 26.

As illustrated in FIG. 5, the coated Pechan prism de-rotating mechanism (12) is in the center of the cylinder (28). The relative position between the coated Pechan prism de-rotating mechanism (12), the stationary collimator array (13) and the rotary collimator array (11) are the same as depicted in FIG. 4. The rotor (21) is part of a gear (26), which is rotatable relative to the stator (22) through the bearings (31 and 32). The cylinder (28) is part of a gear (27), which is rotatable relative to the stator (22) through the bearings (33 and 34). Two gears (24 and 25) are physically connected to the common shaft (23), which is rotatable around the parallel axis (16) relative to the stator (22) through two bearings (35 and 36). As stated above, a gear ratio i=2:1 would assure that the coated Pechan prism de-rotating mechanism (12) will rotate at half the speed of the rotation of the rotary collimator array (11).

We claim:

1. A multi-channel fiber optic rotary joint comprising:
   a rotor;
   a stator;
   a plurality of bears;
   a first collimator array with a rotary axis;
   a second collimator array with a rotary axis;
   a Pechan prism with an plurality optical coatings to minimize back reflection;
   wherein said first collimator array and said second collimator array are aligned with said rotary axes and are relatively rotatable along said rotary axes and having a coated Pechan prism positioned in the optical path between said first collimator array and said second collimator array; wherein is arranged for rotation around said rotary axes relative to each of said first and second collimator arrays at a rotary speed equal to one-half the relative rotational rate between said first and second collimator arrays; and
   a speed reduction mechanism for providing the rotation between said Pechan prism and said first and second collimator array to rotate the Pechan prism at a rotational rate half the rotational rate of said first and second collimator array.

2. A multi-channel fiber optic rotary joint of claim 1, further said optic rotary joint having a plurality of environmental seals.

3. A multi-channel fiber optic rotary joint of claim 1, wherein said speed reduction mechanism is a gearing mechanism with a gear ratio of 2:1; or any other passive mechanical system.

* * * * *